US009062629B2

(12) United States Patent
Burns et al.

(10) Patent No.: US 9,062,629 B2
(45) Date of Patent: Jun. 23, 2015

(54) CARBURETOR FUEL SUPPLY SYSTEM

(71) Applicant: WALBRO ENGINE MANAGEMENT, L.L.C., Tucson, AZ (US)

(72) Inventors: Michael P. Burns, Millington, MI (US); Dale P. Kus, Cass City, MI (US); Paul S. Learman, Bad Axe, MI (US)

(73) Assignee: Walbro Engine Management, L. L.C., Tuscon, AZ (US)

( * ) Notice: Subject to any disclaimer, the term of this patent is extended or adjusted under 35 U.S.C. 154(b) by 96 days.

(21) Appl. No.: 13/677,794

(22) Filed: Nov. 15, 2012

(65) Prior Publication Data

US 2013/0119567 A1 May 16, 2013

Related U.S. Application Data

(60) Provisional application No. 61/559,956, filed on Nov. 15, 2011.

(51) Int. Cl.

| | |
|---|---|
| ***B01D 47/00*** | (2006.01) |
| ***F02M 37/00*** | (2006.01) |
| ***F02M 69/02*** | (2006.01) |
| ***F02M 9/12*** | (2006.01) |
| ***F02M 1/18*** | (2006.01) |

(52) U.S. Cl.
CPC *F02M 9/12* (2013.01); *F02M 1/185* (2013.01)

(58) Field of Classification Search
CPC ......... F02M 17/04; F02M 1/185; F02M 9/12; F02M 1/04
USPC ............................................................ 261/27
See application file for complete search history.

(56) References Cited

U.S. PATENT DOCUMENTS 2,977,948 A * 4/1961 Kittler .......................... 261/39.3
4,814,114 A 3/1989 Charmley
5,611,312 A * 3/1997 Swanson et al. .............. 123/436
5,711,901 A 1/1998 Berg et al.
6,135,429 A 10/2000 Woody
6,431,527 B1 8/2002 Suzuki et al.
6,439,546 B1 8/2002 Galka
6,481,403 B1 * 11/2002 Ashcraft et al. ......... 123/179.11
6,533,254 B1 3/2003 Grifka et al.
6,585,235 B2 7/2003 Pattullo
7,000,595 B2 2/2006 Andersson et al.
7,114,708 B2 10/2006 Douyama et al.

(Continued)

OTHER PUBLICATIONS

Written Opinion & International Search Report for PCT/US12/065247, Mar. 26, 2013, 10 pages.

*Primary Examiner* — Amber Orlando
(74) *Attorney, Agent, or Firm* — Reising Ethington P.C.

(57) ABSTRACT

A purge and prime assembly for a carburetor includes a purge and prime pump that alternately takes in and discharges fluid, and a plurality of passages through which fluid is routed. The passages may include a purge passage through which fluid is drawn by the purge and prime pump, a return passage through which fluid is discharged from the purge and prime pump and discharged from the carburetor, and a priming passage through which a portion of the fluid discharged from the purge and prime pump is routed to a main bore of the carburetor. The assembly may also include a purge valve that prevents fluid from being discharged from the purge prime pump through the purge passage, and a return valve that prevents fluid in the return passage from being drawn into the purge and prime pump.

18 Claims, 10 Drawing Sheets

(56) References Cited

U.S. PATENT DOCUMENTS

| | | | | |
|---|---|---|---|---|
| 7,185,623 | B2 | 3/2007 | Shaw | |
| 7,210,441 | B1 * | 5/2007 | Burns | 123/179.11 |
| 7,690,342 | B2 * | 4/2010 | Gliniecki et al. | 123/179.11 |
| 2002/0135082 | A1 | 9/2002 | Woody | |
| 2003/0015808 | A1 * | 1/2003 | Burns et al. | 261/63 |
| 2008/0163841 | A1 * | 7/2008 | Gliniecki et al. | 123/179.9 |
| 2012/0180488 | A1 * | 7/2012 | Bailey et al. | 60/739 |

* cited by examiner

CARBURETOR FUEL SUPPLY SYSTEM

REFERENCE TO CO-PENDING APPLICATION

This application claims the benefit of U.S. Provisional Application No. 61/559,956 filed Nov. 15, 2011, which is incorporated herein by reference in its entirety.

TECHNICAL FIELD

The present disclosure relates generally to a carburetor and more particularly to a fuel supply system in a carburetor.

BACKGROUND

Carburetors have been used to provide a fuel and air mixture to an engine to support combustion in and operation of the engine. Starting a cold engine can be more difficult that starting a warmer engine. Starting and warming up a cold engine may be facilitated by providing a richer fuel and air mixture to the engine than when the engine has been or is warmed up.

SUMMARY

A purge and prime assembly for a carburetor includes a purge and prime pump that alternately takes in and discharges fluid, and a plurality of passages through which fluid is routed. The passages may include a purge passage through which fluid is drawn by the purge and prime pump, a return passage through which fluid is discharged from the purge and prime pump and discharged from the carburetor, and a priming passage through which a portion of the fluid discharged from the purge and prime pump is routed to a main bore of the carburetor. The assembly may also include a purge valve that prevents fluid from being discharged from the purge prime pump through the purge passage, and a return valve that prevents fluid in the return passage from being drawn into the purge and prime pump.

In at least one implementation, a fuel enrichment system for a carburetor may include a fuel metering diaphragm, a pressure pulse passage and a valve. The fuel metering diaphragm defines part of a fuel metering chamber and a reference chamber. The pressure pulse passage communicates a source of pressure pulses with the fuel metering diaphragm to increase the rate at which fuel is discharged from the fuel metering chamber. And the valve is moveable between open and closed positions to at least substantially prevent communication of the pressure pulses with the fuel metering diaphragm when the valve is in its closed position.

A method of forming a fuel flow restrictor includes providing a material, and forming an opening in the material so that the opening has an effective flow area of between 0.05 and 0.3 mm. In thin sheets or films, the opening may be formed by a laser to its final dimension. In thicker materials, the opening may be initially machined and further formed by deforming the material to reduce the effective flow area of the machined opening and provide a desired effective flow rate therethrough.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 2:
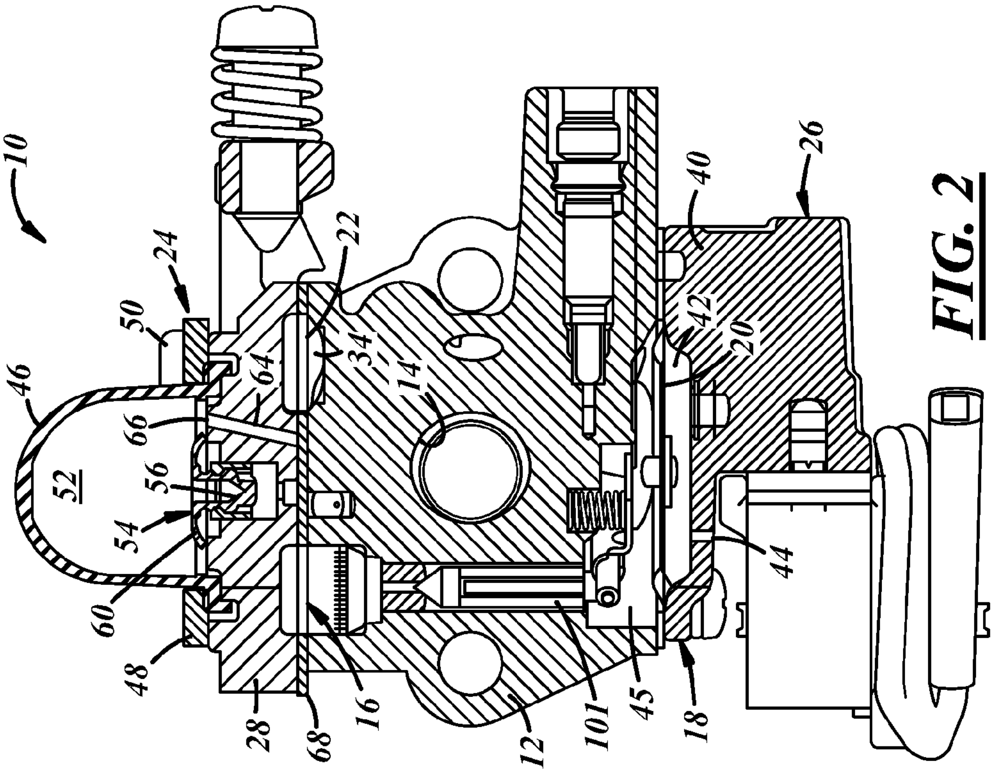
FIG. 2 is a sectional view of the carburetor of FIG. 1.
Figure 1:
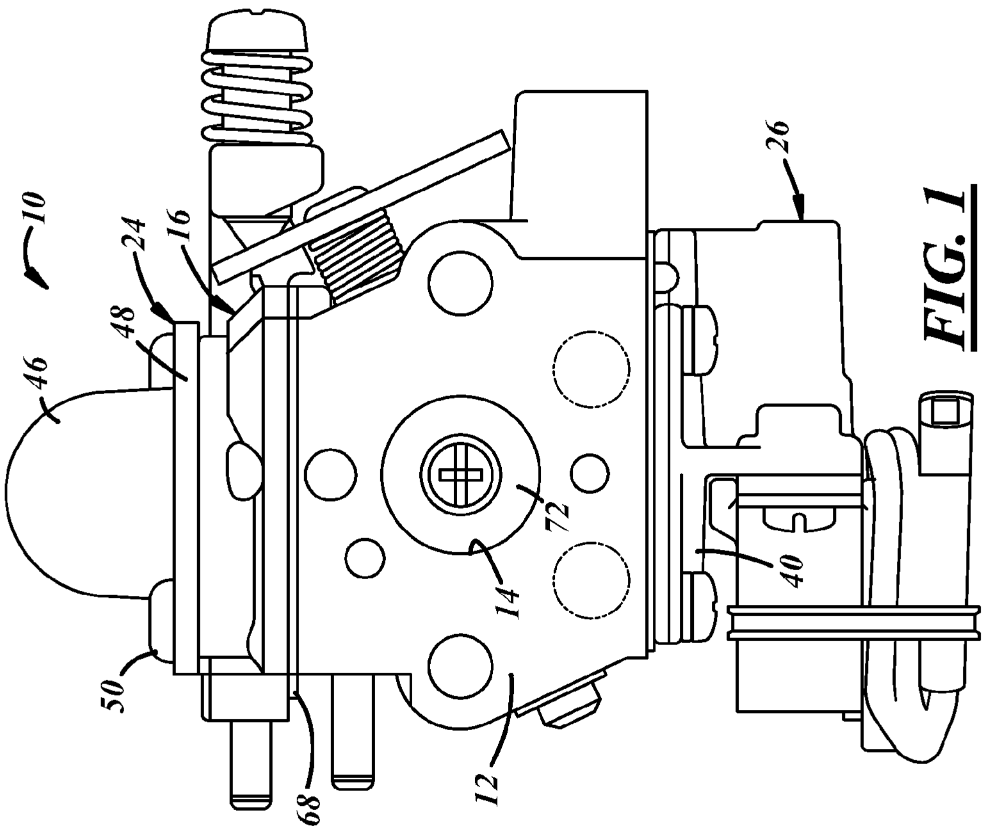
FIG. 1 side view of a diaphragm-type carburetor including a purge/prime system and a solenoid controlled fuel enrichment system.
Figure 3:
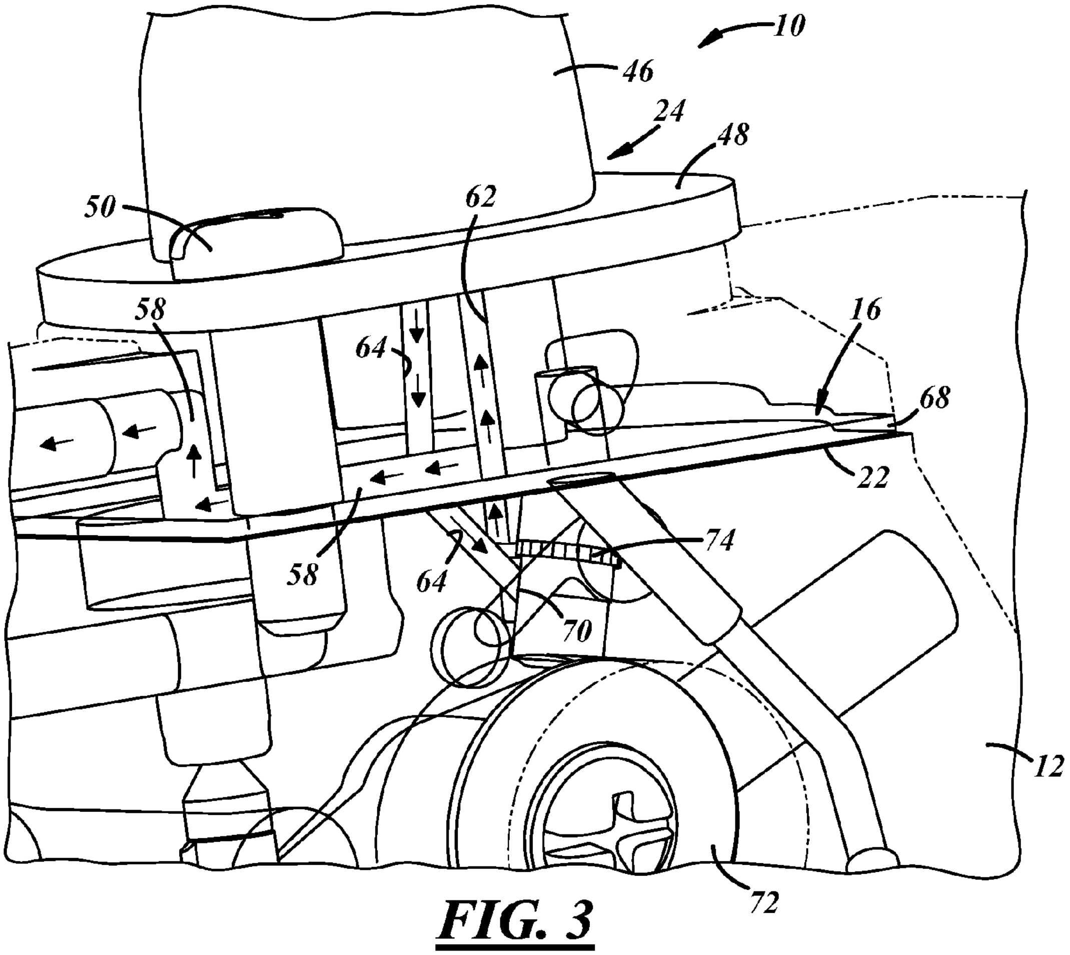
FIG. 3 is an enlarged, fragmentary view of the carburetor showing a purge and prime assembly including an internal priming passage and purge passages of the carburetor.

Referring in more detail to the drawings, FIGS. 1-3 illustrate a carburetor 10 that provides a fuel and air mixture to an engine to support operation of the engine. The carburetor 10 has a main body 12 (typically cast metal) with a main bore 14 through which air flows from an air cleaner to an engine intake. The carburetor 10 also has a fuel circuit through which fuel is provided into the main bore 14 to form the fuel and air mixture. The fuel circuit includes a fuel pump assembly 16 and a fuel metering assembly 18. The fuel metering assembly 18 includes a diaphragm 20 (FIG. 2) that controls the rate at which fuel is delivered into the main bore 14 in accordance with a pressure differential across the metering diaphragm 20. The fuel pump assembly 16 includes a diaphragm 22 that is driven to take in fuel from a fuel source and discharge fuel to the fuel metering assembly 18. To facilitate starting the engine, the fuel circuit may also have a purge and prime circuit 24 through which stale fuel and vapors may be removed from the carburetor 10 as fresh fuel is drawn into the carburetor before starting an engine. At the same time, a metered amount of fuel may be discharged into the main bore to make additional fuel available to the engine prior to starting the engine. And to facilitate warming up an engine after it is started, the fuel circuit may include a pressure signal circuit 26 (FIGS. 2, 7 and 8) to increase the rate of fuel delivery during engine warm-up to support initial engine operation.

Figure 4:
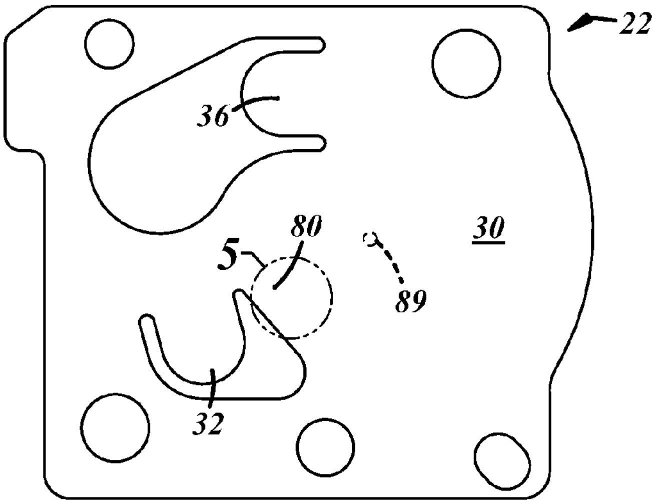
FIG. 4 is a plan view of a fuel pump diaphragm.

As shown in FIGS. 1-5, the fuel pump assembly 16 may include a fuel pump body 28 that defines part of the fuel pump assembly, including fuel flow paths for the fuel pump assembly, and traps the fuel pump diaphragm 22 against the carburetor main body 12. As shown in FIG. 4, the fuel pump diaphragm 22 includes a pump portion 30, an inlet valve 32 that admits fuel into a pump chamber 34 (FIG. 2) adjacent to the pump portion 30, and outlet valve 36 that permits fuel to be discharged from the pump chamber 34. The fuel metering assembly 18 may include a fuel metering body 40 that traps the fuel metering diaphragm 20 against the carburetor main body 12 and, with the fuel metering diaphragm 20, defines a reference chamber 42 that may be at atmospheric pressure due to a vent 44 formed in the body 40. A fuel metering chamber 45 is defined on the opposite side of the fuel metering diaphragm as the reference chamber and fuel is provided to the main bore 14 from the fuel metering chamber 45 in normal operation of the carburetor 10 and engine. The general constructions and functions of the fuel pump assembly 16 and the fuel metering assembly 18 are known in the art and will not be described further.

The purge and prime circuit 24 is shown in FIGS. 2 and 3. The circuit 24 includes a purge/prime bulb 46 and fuel passages, valves and flow restrictors to control fuel flow in the circuit. A peripheral edge of the bulb 46 is trapped against the fuel pump body 28 by a retainer 48 which may be connected to the fuel pump body 28 by one or more screws 50, which may also couple the fuel pump body 28 to the main body 12. A purge/prime chamber 52 is defined between the interior of the bulb 46 and the fuel pump body 28. The pressure in the chamber 52 increases when the bulb 46 is actuated (e.g. depressed or compressed) to discharge fluids from the chamber 52, and the pressure in the chamber 52 decreases when the bulb 46 returns from its depressed to its normal state to draw fluid into the chamber 52. A two-way valve 54 controls the admission of fluids into the purge/prime chamber 52 and the discharge of fluids therefrom. In one form, the valve 54 may be a mushroom shaped valve having a stem 56 through which fluid may be discharged from the bulb chamber 52 and into a purge passage 58 (FIGS. 3 and 6) that leads to a fuel tank, but which is closed to prevent fluids from entering the bulb chamber 52 through the purge passage 58. The valve 54 may also have a flexible head 60 the periphery of which is displaced by a reduced pressure in the chamber 52 caused by expansion of the bulb 46 as the bulb returns to its uncompressed or normal state to permit fluid flow into the chamber 52 through an inlet passage 62. The head 60 is pressed against the pump body 28 when the bulb 46 is depressed to close the inlet passage 62 and prevent fluid from being discharged from the chamber 52 through the inlet passage 62. In this way, fluids may be drawn through the carburetor 10, into the chamber 52, and then discharged from the chamber 52 to the purge passage 58 to purge the carburetor 10 of stale fuel and/or vapors. This pumping action may also draw fresh fuel into the carburetor 10 to prime the carburetor fuel passages with fresh fuel to facilitate starting and operation of the engine.

In addition to the purge passage 58 through which fluids are routed to the fuel tank, the purge and prime circuit 24 may also include a priming passage 64 (shown in FIGS. 2 and 3). The priming passage 64 communicates with the bulb chamber 52 and the main bore 14 of the carburetor 10 to provide a charge of fuel into the main bore when liquid fuel is present in the chamber 52 and the bulb 46 is depressed. In more detail, in the example shown in FIG. 2, the priming passage 64 may have a first end 66 that is located outboard of the head 60 of the valve 54 so that flow through the priming passage 64 is not controlled by the valve 54. The priming passage 64 may extend through the fuel pump body 28, through the fuel pump diaphragm 22, through a gasket 68 located between the fuel pump diaphragm 22 and the pump body 28, and into the main body 12 where its second end 70 either terminates directly into the main bore 14 or in a passage or chamber that leads to the main bore. The priming passage 64 may provide fuel to the main bore 14 anywhere along the length of the main bore. Where the main bore 14 includes a reduced diameter neck or venturi portion, the priming passage 64 may provide fuel downstream of the venturi, although upstream of the venturi is also possible. Likewise, the priming passage 64 may provide fuel downstream of a throttle valve 72 of the carburetor 10, although upstream of the throttle valve 72, or in the same region as the throttle valve are also possible. The priming passage 64 may be separate from and not communicated with the purge passage 58, although the priming passage 64 could branch off of the purge passage 58 rather than directly open into the bulb chamber 52. A check valve 74 may be provided, if desired, in the priming passage 64 to prevent fluids from being drawn into the chamber 52 through the priming passage 64. That is, the check valve 74 may ensure that fluids flow only into the main bore 14 from the priming passage 64 and not out of the main bore 14 into the priming passage 64.

Repeated actuations (e.g. depressions) of the bulb 46 will purge stale fluids from the carburetor 10 and prime the carburetor with fresh, liquid fuel. Some of the fresh liquid fuel may be discharged from the bulb chamber 52, through the priming passage 64 and into the main bore 14 of the carburetor 10 to provide a charge of fuel prior to starting the engine, to facilitate starting the engine.

Figure 6:
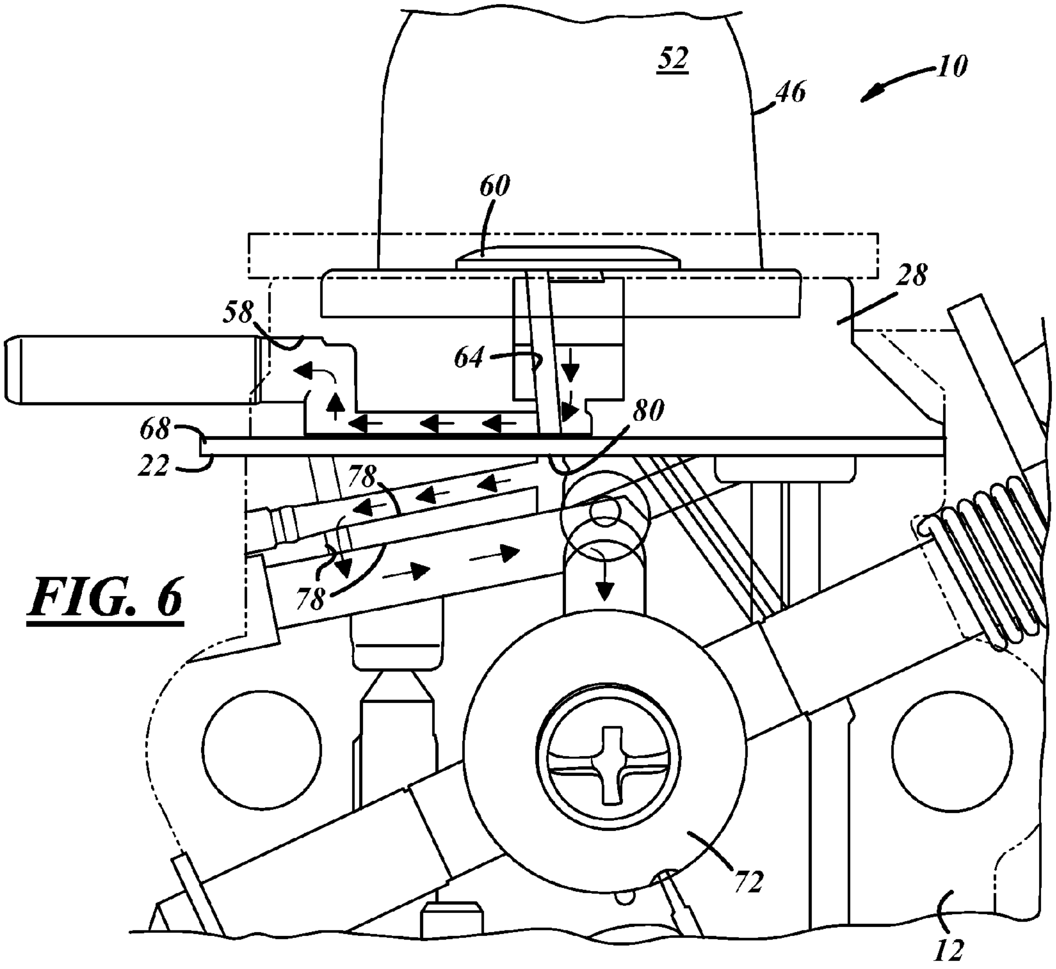
FIG. 6 is an enlarged, fragmentary view of the carburetor showing a purge and prime assembly including an internal priming passage of the carburetor.

As shown in FIG. 6, one or more auxiliary passages 78 or chambers may be provided as part of the priming passage 64 or in communication with the priming passage 64 and capable of holding fuel that may be provided to the main bore 14. This may provide an extra volume of fuel than can be drawn or fed into the main bore 14 to facilitate starting and initial operation after starting the engine. In the example shown in FIG. 6, the auxiliary passages 78 form a loop with upper and lower passages (as viewed in FIG. 6) and connecting passages. These extra passages 78 may also provide a venting action that helps fuel flow more readily through the priming passage 64 than it would through a single passage enclosed at one end by the bulb 46.

Figure 5:
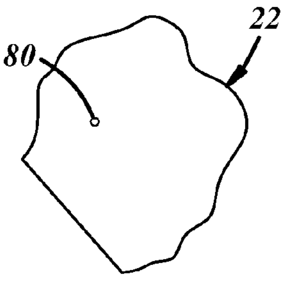
FIG. 5 is an enlarged fragmentary view of a portion of the fuel pump diaphragm.

To control the flow rate of priming fuel that flows through the priming passage 64 and into the main bore 14, a flow restrictor 80 may be provided in the priming passage 64. The flow restrictor 80 reduces the likelihood that the engine will be "flooded" by providing too much fuel into the main bore 14 prior to starting the engine. By reducing the fuel flow rate through the priming passage 64, most of the fluid discharged from the bulb chamber 52 will be routed to the fuel tank through the purge passage 58 which has greater diameter or flow area compared to the restriction, and only a desired amount of fuel will flow into the main bore 14 from the priming passage 64. The ratio of flow areas of the flow restrictor 80 to the purge passage 58 (e.g. the smallest effective flow area of the purge passage 58) may be between 0.025:1 and 0.2:1. In one form, as shown in FIGS. 4 and 5, the flow restrictor 80 includes an opening formed in the fuel pump diaphragm 22. The opening 80 may be spaced from the pump portion 30 of the diaphragm 22, and the inlet and outlet valves 32, 36, such that the opening 80 is formed in a location of the diaphragm 22 that will not affect normal operation of the fuel pump diaphragm 22.

In the implementations of FIGS. 1-8, the opening 80 defines the smallest flow area portion of the priming passage 64 and determines the maximum restriction to flow through the priming passage 64. In the example shown, the fuel pump diaphragm 22 is a thin, generally planar sheet of material, such as a polyester film (for example, a BoPET film or the like), and the opening may be 0.05mm in diameter or larger. To repeatedly and accurately form an opening of this size, a laser may be used. Of course, the diaphragm 22 could be formed of any other suitable material, including a thin metal sheet, or various other polymers and composites. In this example, the restrictor (e.g. opening 80) is formed in the same piece of material with the fuel pump diaphragm 22 such that a separate component (e.g. a jet or restrictor) is not needed and cost and assembly time and effort can be reduced.

In the example of a carburetor for a 27 cc engine, the opening may be between 0.05mm to 0.3mm in diameter, and these opening sizes also may be used in engines of other sizes. The amount of priming fuel provided through the opening can be a function of the number of times the bulb 46 is actuated, and the volume of the bulb compared to the volume of the passages through which fluid is moved by the bulb. Although not required in every implementation, the laser cut opening 80 in the diaphragm 22 can be made smaller than machined jets or nozzles that may otherwise be used as flow restrictions. Conventional jets or nozzles for carburetors are drilled or machined parts that have a flow area or opening diameter of at least 0.3mm. Accordingly, much smaller restrictions can be economically achieved by the opening 80 formed in the thin sheet or thin film diaphragm 22 as described herein. Of course, larger openings can also be formed in the diaphragm to restrict fuel flow therethrough. A larger opening may be used to regulate the main fuel flow path from the metering chamber 45 to the main bore 14, and such an opening 89 (show in dashed lines may be used instead of a traditional jet or flow restrictor. This may reduce part count and cost to manufacture and assemble the carburetor.

Figure 13:
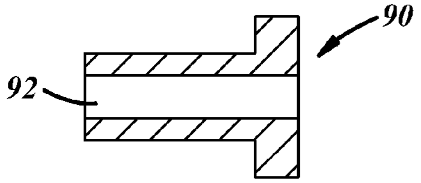
FIG. 13 is a cross-sectional view of a jet.
Figure 14:
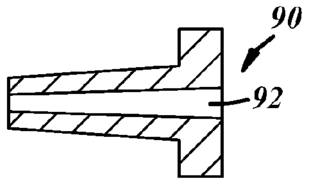
FIG. 14 is a cross-sectional view of the jet in FIG. 13 after it has been deformed.

A deformable jet 90 could also be used in addition to or instead of the opening 80, where a larger diameter opening 92 in the jet is reduced in size by crushing or otherwise deforming the jet to reduce the effective flow area of its opening. In FIG. 13 the jet 90 is shown before deformation and in FIG. 14 the jet 90 is shown after deformation. In one implementation, the jet 90 could be a somewhat elongated body formed of brass or another, deformable material. The jet 90 could be coupled to a flow meter (such as an air flow meter) and then deformed, such as in a collet, until a desired flow rate is achieved. This can permit a smaller opening 92 to be provided in a jet 90 than can be machined or otherwise formed in the jet.

Figure 9:
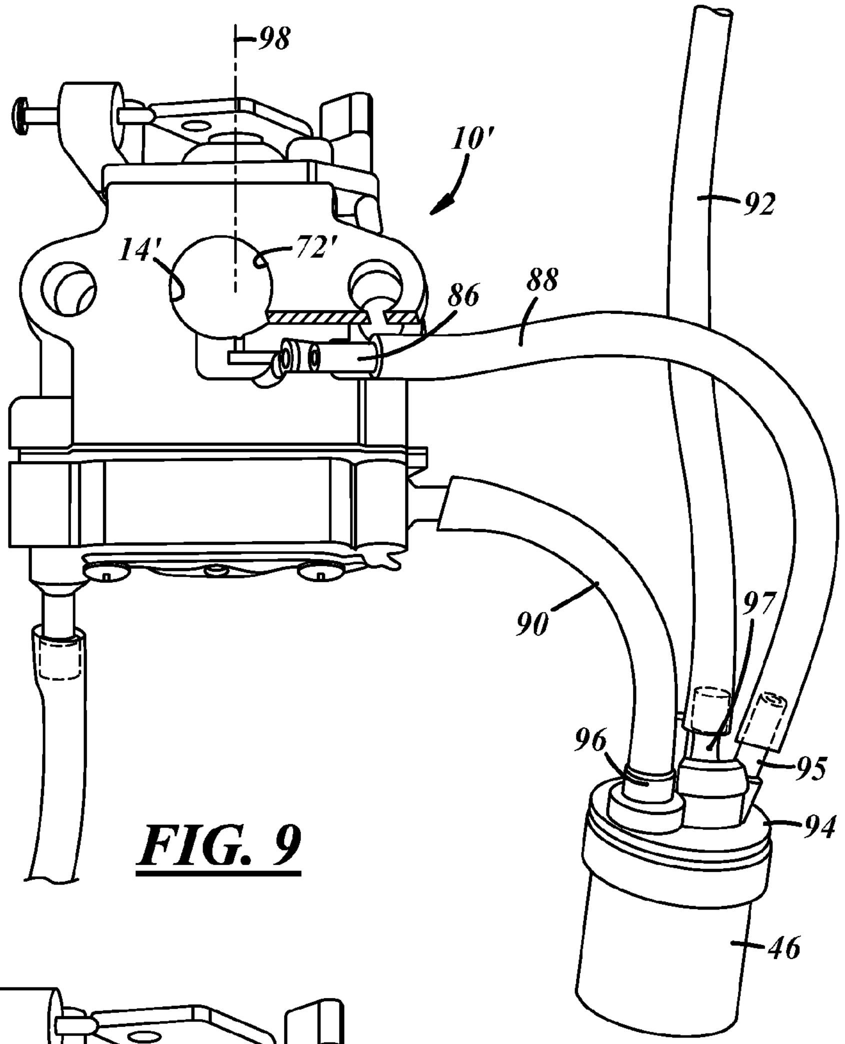
FIG. 9 is a perspective view of a carburetor having a remotely located purge prime pump.
Figure 10:
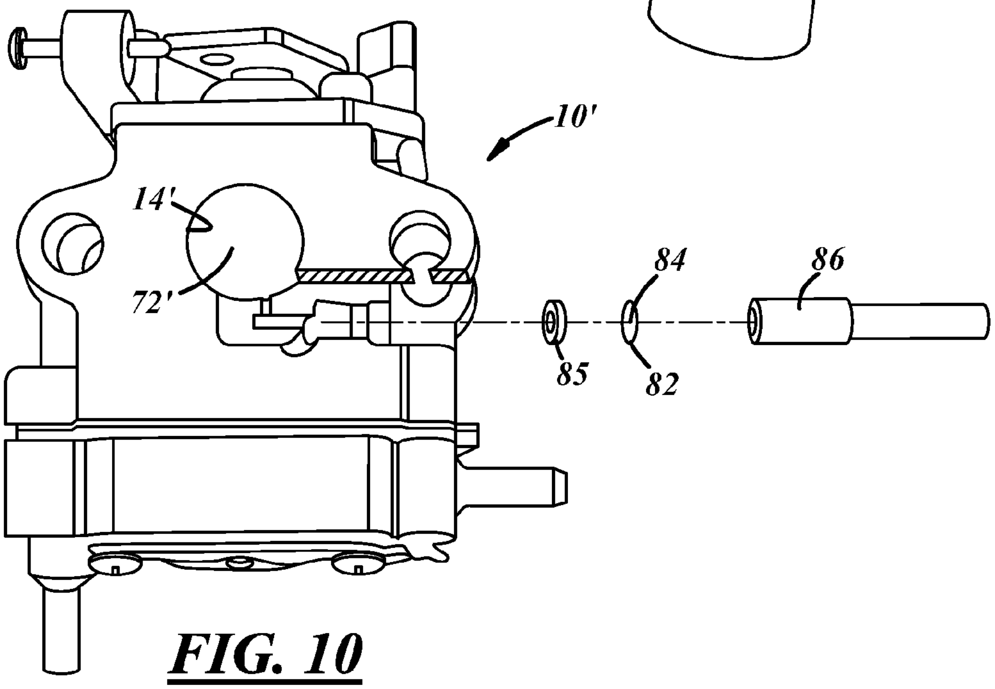
FIG. 10 is an exploded view of the carburetor of FIG. 9 showing a flow restrictor and associated components associated with a priming passage of the carburetor.
Figure 11:
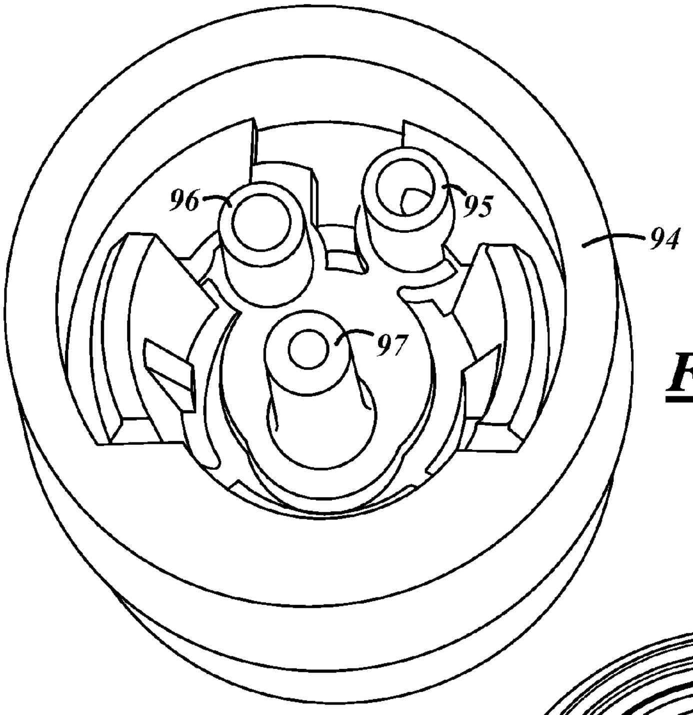
FIG. 11 is a bottom perspective view of a purge prime pump.
Figure 12:
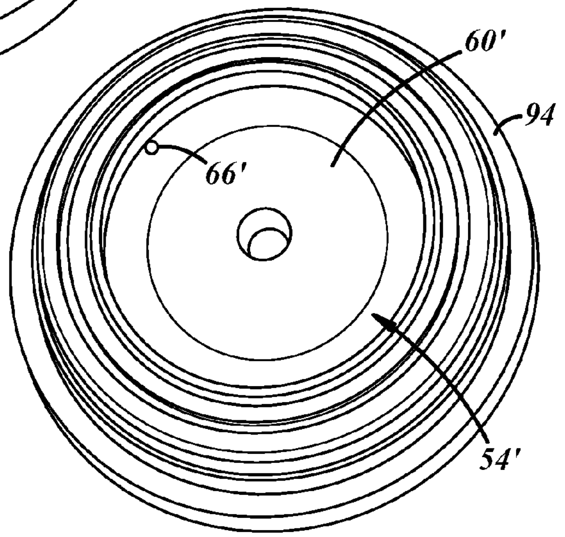
FIG. 12 is a top perspective view of the purge prime pump body with an actuating bulb removed.

In addition to the opening formed in the diaphragm, a flow restrictor could be formed separately from the diaphragm, but in a similar manner. As shown in FIGS. 9 and 10, an insert 82 may include a thin film or thin sheet of material, like that described above for the fuel pump diaphragm 22, and may have an opening 84 to restrict fluid flow past the insert. The insert 82 may be separate from the diaphragm 22 and may be to provide a flow restriction in the priming passage 64, and as such, it may be disposed within the priming passage 64 and the opening 84 may be as described above with regard to the opening 80 in the fuel pump diaphragm 22, where all of the priming fuel delivered to the main bore 14 flows through the hole in the insert 82. As shown in FIG. 10, the insert 82 may be backed by a seal, such as an o-ring 85, and it may be trapped between the o-ring 85 and a hose fitting 86 carried by the carburetor body. Of course, other arrangements of the insert 82 may be provided. The hose fitting 86 may receive an end of a hose 88 defining part of the priming passage 62 in this implementation. As shown in FIGS. 9 and 10, the bulb 46 may be located remotely from the carburetor 10' (e.g. not carried directly on or by the carburetor) and communicated with the carburetor by three hoses. In addition to the hose 88, a hose 90 routes purge flow from the carburetor 10 to the purge and prime bulb 46, and a hose 92 routes the purge flow from the purge/prime bulb 46 to the fuel tank. As shown in FIG. 9 and FIGS. 11 and 12, the bulb may be carried by a base 94 having fittings 95, 96, 97 and associated passages through the base 94 for each hose 88, 90, 92, defining part of the passages for the various fluid flows into and out of the bulb chamber 52. FIG. 12 shows the inlet end 66' of the priming passage and the head 60' of the valve 54'. As shown, the carburetor 10' is a rotary throttle valve carburetor having a cylindrical throttle valve 72' rotated about an axis 98 perpendicular to the main bore 14' to vary the alignment of a hole through the throttle valve with the main bore, as is known in the art. Of course, the carburetor 10' may be the same as the carburetor 10 previously described. The opening(s) in the diaphragm or an insert may be used in any type of carburetor to control any desired fuel flow path or circuit.

Figure 7:
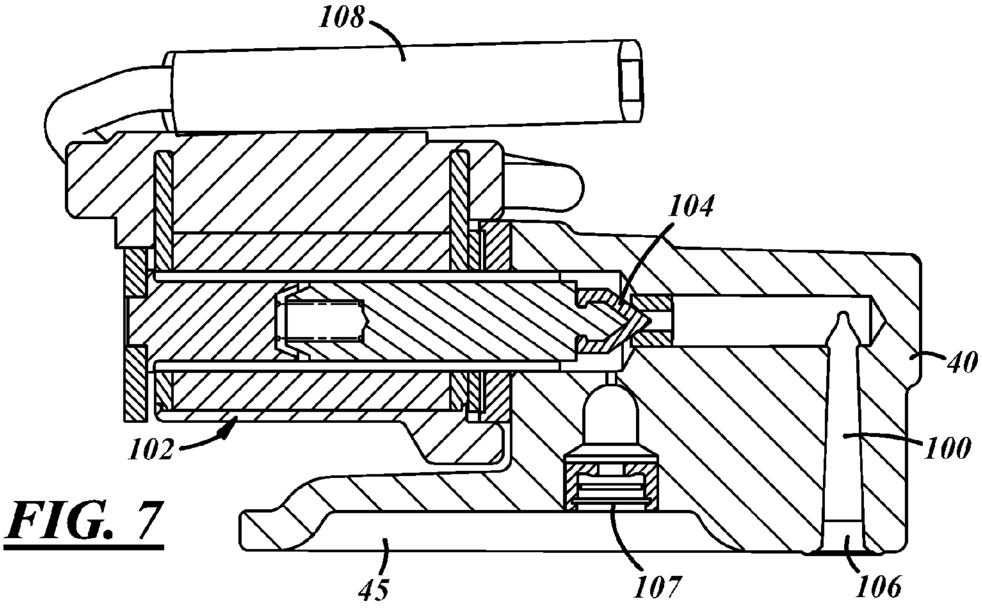
FIG. 7 is a sectional view of a fuel metering body showing a pressure pulse valve carried by the fuel metering body.
Figure 8:
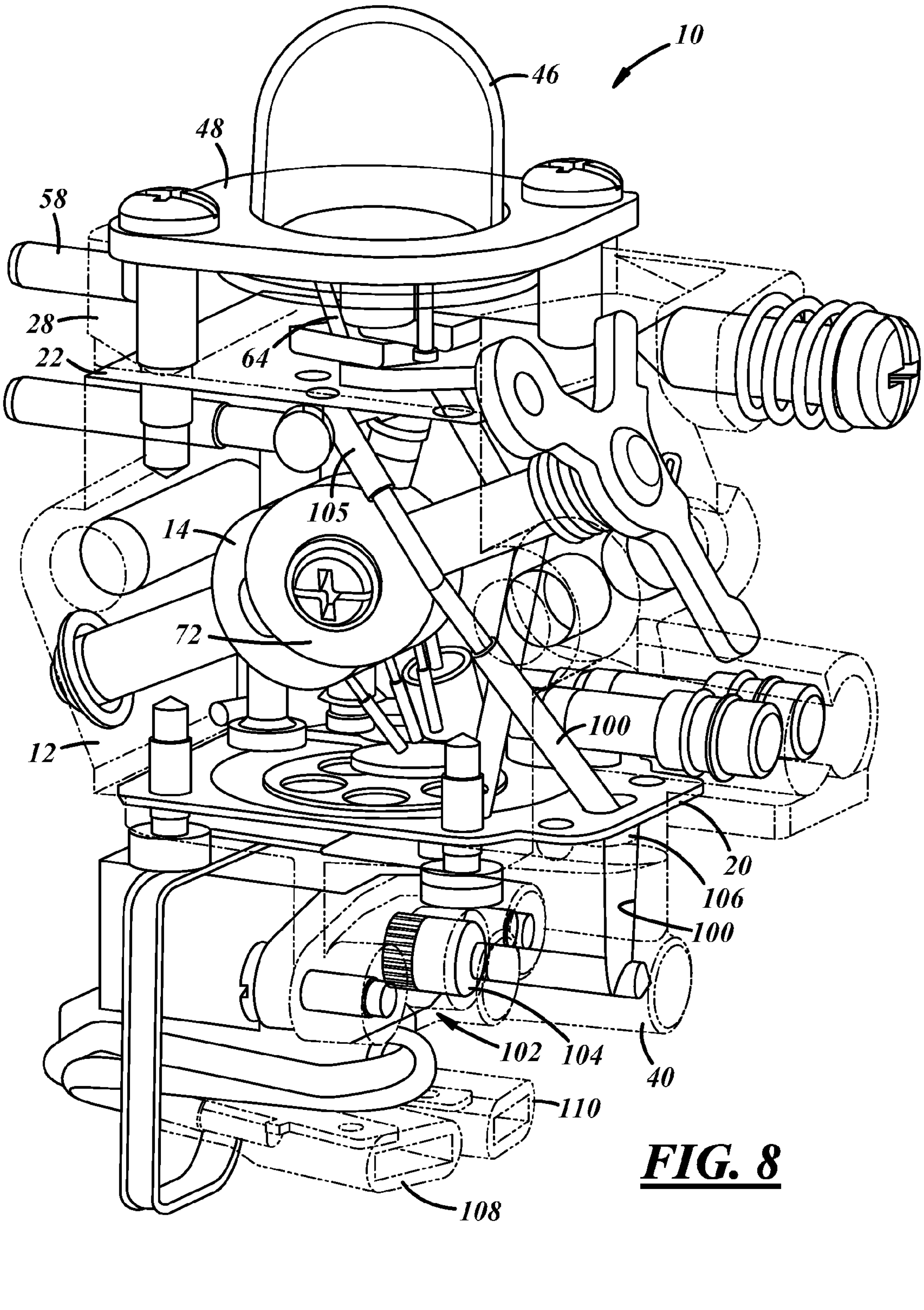
FIG. 8 is a perspective view of the carburetor showing some internal components including a pressure pulse passage in the main body of the carburetor.

In addition to the priming fuel supplied to the main bore 14 to assist in starting the engine, an enriched fuel supply can be provided from the carburetor 10 to the engine to support engine operation as and after the engine is started. FIGS. 7 and 8 illustrate one implementation of a fuel enrichment system that causes the carburetor 10 to provide to the engine a richer than normal fuel and air mixture. The fuel enrichment system includes a pressure pulse passage 100 through which engine pressure pulses are communicated with the fuel metering diaphragm 20, in the reference chamber 42 and on the dry side of the diaphragm 20. When the pressure pulses are communicated with the fuel metering diaphragm 20, the diaphragm 20 is displaced in a direction tending to increase the size of the reference chamber 42 which decreases the volume of the fuel metering chamber 45. This opens a metering valve 101 (FIG. 2) and admits additional fuel into the fuel metering chamber 45 to increase the amount of fuel discharged from the fuel metering assembly 18 to the main bore 14 and provide an enriched fuel and air mixture to the engine.

To control when the enriched fuel and air mixture are supplied to the engine, the fuel enrichment system may include a valve 102 that reduces or prevents application of the pressure pulses through the pressure pulse passage 100. In the implementation shown, the valve 102 is a solenoid valve including a valve head 104 that may be electrically driven from a closed position preventing pressure pulses from being applied through the pressure pulse passage 100 and an open position permitting pressure pulses to be applied through the pressure pulse passage 100 to the fuel metering diaphragm 20. The solenoid can be energized to move the valve head 104 to its open position in accordance with a predetermined scheme or algorithm that may take into account many factors including one or more of ambient temperature and engine temperature where the goal of providing an enriched fuel and air mixture is to facilitate initial operation of a cold engine. In this way, the solenoid valve 102 may be opened during at least a portion of the time an engine is warmed up after starting the engine. Of course, the solenoid valve could be energized to provide an enriched fuel and air mixture in other circumstances, as desired. For example, an enriched fuel and air mixture may be desirable to support engine acceleration, facilitate deceleration (and prevent a too lean comedown), and/or prevent the engine from operating at too high of a speed.

As shown, the pressure pulse passage is communicated at one end 105 with a passage that communicates engine pressure pulses to the fuel pump diaphragm, and the passage 100 extends through the main body 12 to the fuel metering body 40. To receive the engine pressure pulses, the pressure pulse passage 100 may have an inlet 106 in the fuel metering body 40 and may extend past the valve head 104, a check valve 107 (FIG. 7) and open into the reference chamber 42. The engine pressure pulses include positive and negative pressure pulses. The check valve 107 may be arranged to prevent negative pressure pulses from being communicated with the fuel metering diaphragm 20 while permitting positive pressure pulses to act on the diaphragm 20. Of course, other paths may be provided to communicate a pressure signal, like engine pressure pulses, to the metering diaphragm 20 and such paths may include passages within the carburetor bodies 12, 28, 40 and/or tubes or conduits routed outside of the bodies 12, 28, 40.

Still further, the pressure pulse passages may be used to drive or change a pressure differential across a component other than the fuel metering diaphragm. For example, an auxiliary pump (such as shown in U.S. Pat. No. 7,185,623) may be driven by a pressure pulse signal and the solenoid may control application of the pressure pulse signal to the auxiliary pump to selectively alter the performance of the auxiliary pump. This may improve starting of the engine, or may affect fuel flow within the carburetor at other times (perhaps supplying additional fuel during acceleration, or leaning out fuel supplied by not actuating the auxiliary pump, as desired).

The solenoid valve 102 may be carried by the carburetor 10. In the implementation shown, the solenoid valve 102 is incorporated into and carried by the fuel metering body 40 and when closed, the head 104 blocks or substantially restricts a portion of the pressure pulse passage 100 that is formed in the fuel metering body 40. The solenoid valve 102 may be driven by electrical power supplied by an ignition system for the engine, such as a capacitive discharge ignition system. To facilitate wiring the solenoid power leads 108, 110 into the ignition system circuit, the power leads can be wired to the leads of a kill switch or terminal commonly found on small engines for such things as chainsaws, weed trimmers, leaf blowers and the like. In this way, the solenoid valve can be used with an engine that does not include a battery, alternator or other similar power source.

The diaphragm 22 and insert 82, or other body through which a flow restrictor for a fluid flow path is formed, may be between 0.02 to 0.35mm thick in the direction of fluid flow through the opening 80, 84 formed therethrough. That is, the openings 80, 84 can be formed in very thin sheets or films of suitable materials, without the need for larger metal parts, like brass jets and the like. The thin sheets or films may be made of polymers (including the polyester films noted previously, as well as other polymers) or metals (stainless steel may be used for corrosion resistance, where desired). Of course, thicker sheets, films can be used and they may be part of another carburetor component, like a diaphragm or gasket, or they may form a separate insert to provide a flow restrictor independently of other components. When formed in the same piece of material as another component of the carburetor, the component of the carburetor may retain its original function and also provide the flow restriction in a single part (e.g. the opening 80 does not affect the function of the fuel pump diaphragm 22). And, as noted above, metal jets or other deformable jets may be used. A metal or other jet may be used to provide smaller openings than may be readily machined into the jets, such as by deforming the jets to provide a smaller effective flow area, or without deformation where smaller-than-can-economically-be-machined openings are not needed.

Figure 15:
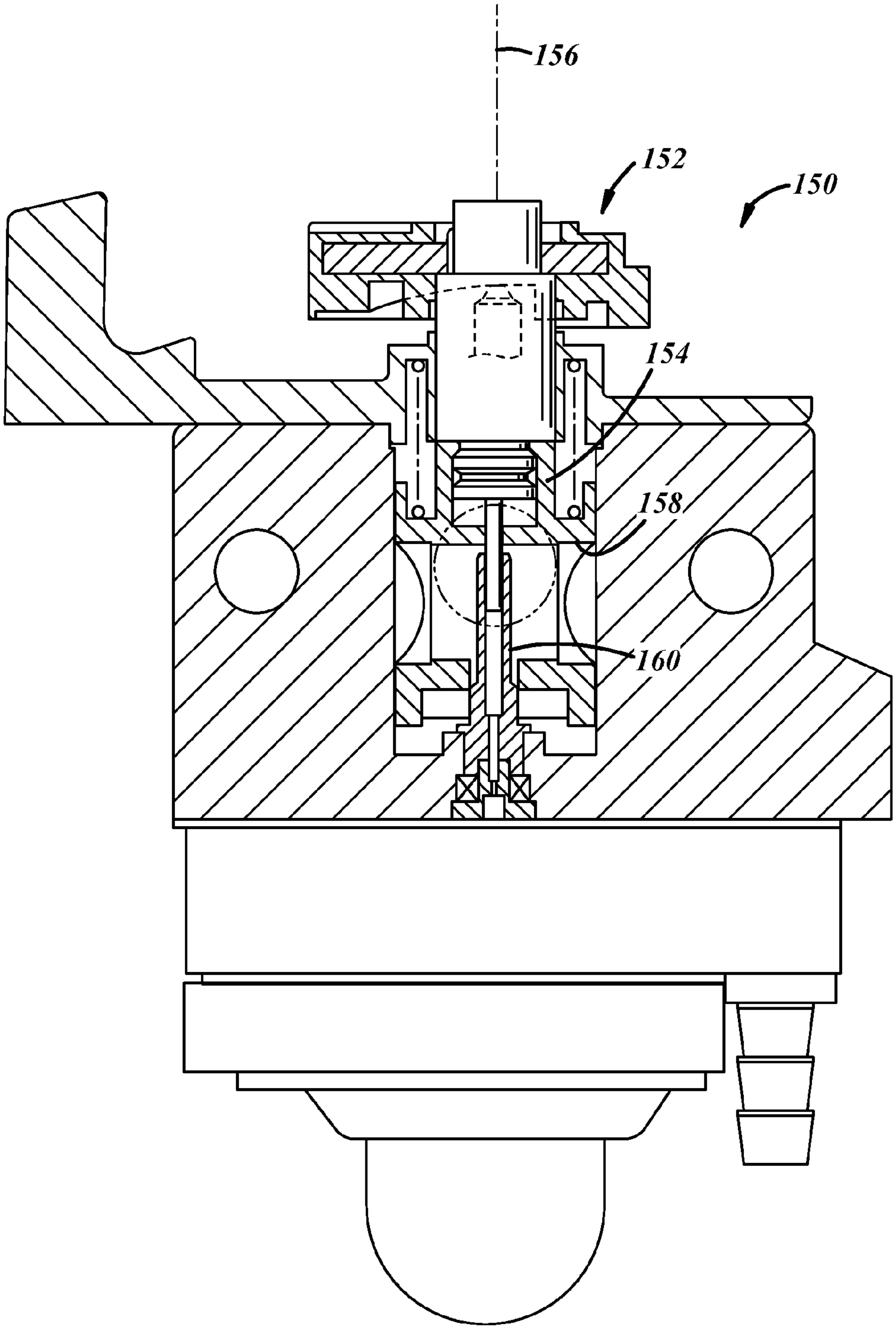
FIG. 15 is a side view partially in section of a rotary throttle valve carburetor.

In at least some implementations, a carburetor may include a barrel-type or rotary throttle valve. Such a carburetor 150 is shown in FIG. 15 and described generally in U.S. Pat. No. 7,114,708, entitled "Rotary Throttle Valve Carburetor" and issued on Oct. 3, 2006, the disclosure of which is incorporated by reference herein, in its entirety. The rotary throttle valve 152 of this carburetor 150 has a cylindrical body 154 that is rotated about an axis 156 and has a main throttle bore 158 through which air flows from an inlet side upstream of a main fuel nozzle 160 to an outlet side downstream of the nozzle. Fuel flows through the nozzle 160 and joins the air flow in the throttle bore 158 and the fuel and air mixture are delivered to an engine.

Figure 16:
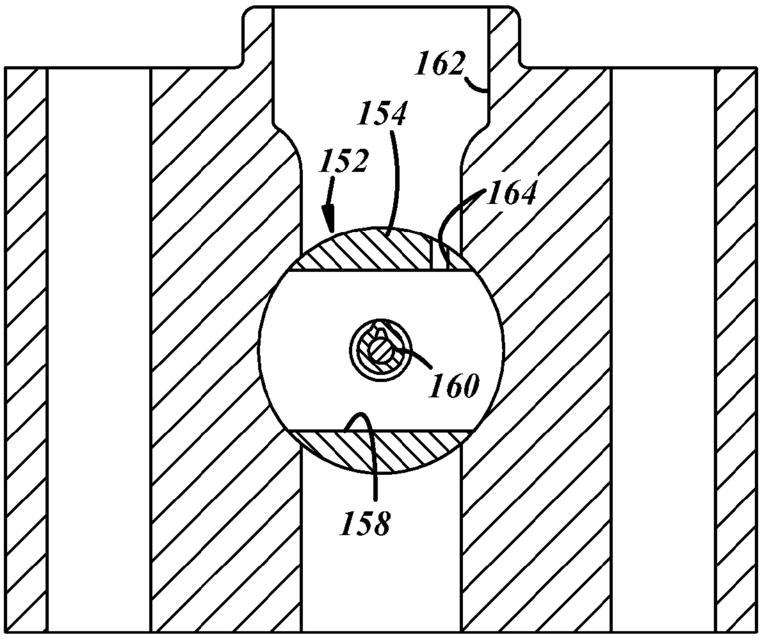
FIG. 16 is a sectional view of part of the carburetor of FIG. 15 showing a throttle valve in a closed position.
Figure 17:
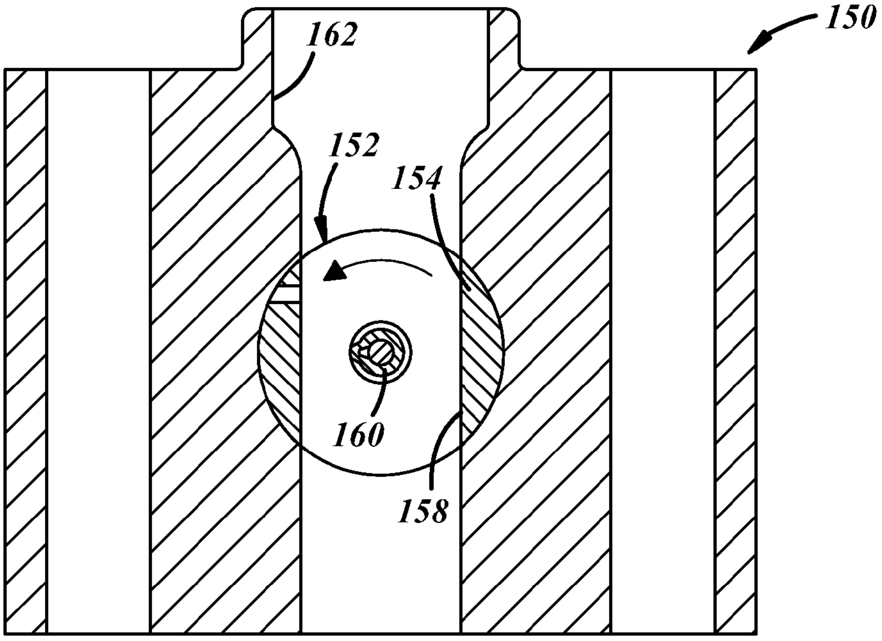
FIG. 17 is a view like FIG. 16 showing the throttle valve in its wide open position.

As best shown in FIG. 16, the throttle valve body 154 includes the main bore 158 through which air flows and into which the nozzle 160 extends. The throttle bore 158 is variably aligned with the carburetor main bore 162 as the throttle valve body 154 is rotated. In FIG. 16, the throttle valve 152 is shown in its idle position wherein the throttle bore 158 is substantially not aligned with the carburetor main bore 162, and in FIG. 17 the throttle valve 152 is shown in its wide open position wherein the throttle bore 158 is fully aligned with the carburetor main bore 162.

In FIG. 16, the throttle body 154 includes a supplemental void 164 open to the carburetor main bore 162 (at least when the throttle valve 152 is in its idle position) and leading to the throttle bore 158. The supplemental void 164 includes an opening through a sidewall of the throttle body 154 that is on the upstream side or portion of the throttle body. Here, upstream refers to the direction of fluid flow through the throttle bore and is relative to an idle position of the throttle valve (in FIG. 16 the throttle valve is shown in a closed position, which is rotated more closed than its normal idle position). If a choke valve is provided, then this side of the throttle body 154 would be closest to the choke valve, at least in the idle position. The opening 164 permits additional air to flow into the main throttle bore 158, at least when the throttle valve 152 is in its idle position, and thereby reduces the magnitude of a vacuum signal within the throttle bore 158 and acting on the fuel nozzle 160. This would allow a larger outlet opening to be provided in the nozzle 160 during starting and engine idle operation. Accordingly, the engine may be calibrated to provide a relatively richer fuel and air mixture to support partial throttle operation, acceleration and high speed engine operation without also supplying too rich of a fuel and air mixture for idle operation. A larger outlet opening in the nozzle 160 at idle can also reduce the chance of the nozzle being plugged with debris, and can improve starting the engine with the throttle valve 152 partially open (e.g. a fast idle start).

Figure 18:
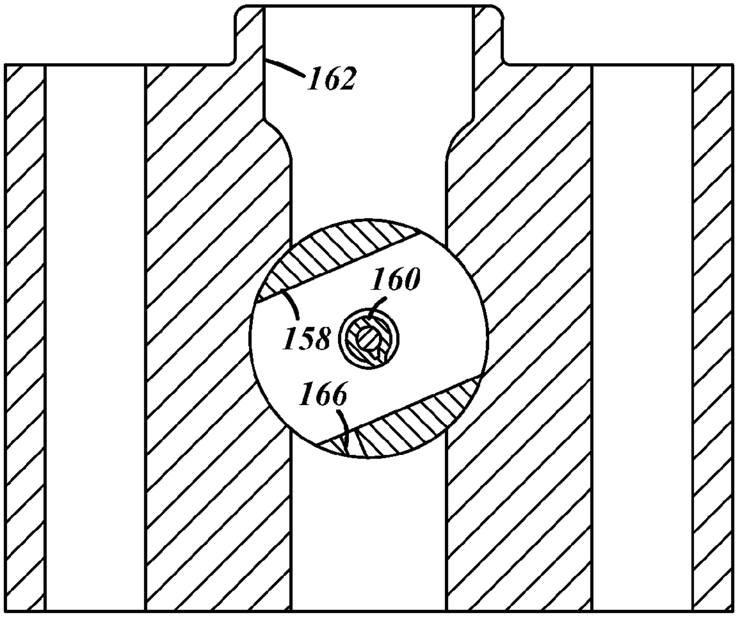
FIG. 18 is a view like FIG. 16 showing a modified throttle valve in its idle position.

FIG. 18 illustrates a carburetor similar to that shown in FIG. 16 and the same reference numbers are used for components and features that are the same or similar to those in FIG. 16. Here, an alternate supplemental void is defined by an opening 166 through the throttle body 154, with this opening 166 being formed in a portion of the throttle body sidewall facing downstream of the throttle body 154. Here, downstream refers to the direction of fluid flow through the throttle bore and is relative to the idle position of the throttle valve (throttle valve is shown in or close to its normal idle position in FIG. 18). The opening 166 directly communicates the throttle bore 158 with a downstream portion of the main carburetor bore 162. This facilitates transmission of an engine vacuum signal to the fuel nozzle 160 and thereby increases the pressure drop across the fuel nozzle 160 to increase fuel flow from the nozzle at engine start up and idle operation. The increased vacuum signal can increase the rate at which fuel reaches the engine to reduce the number start up attempts (perhaps starter rope pulls) needed to start the engine. And a smaller fuel nozzle opening could be used and may permit improved control of emissions during idle operation.

Figure 19:
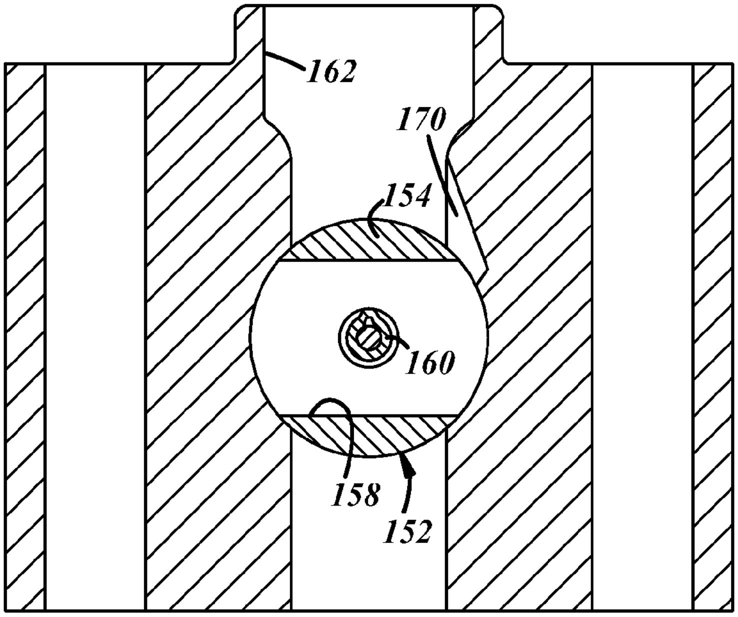
FIG. 19 is a sectional view of part of the carburetor of FIG. 15 showing a cavity in the carburetor body communicating with a throttle valve bore when the throttle valve is in its closed position.

In FIG. 19, another supplemental void is defined by a slot or cavity 170 formed in the carburetor body. The cavity 170 is formed in the carburetor main bore 162 beginning upstream of the throttle body 154 and terminating at a location radially adjacent to the throttle body 154 and communicating with the throttle bore 158. In this manner, even with the throttle valve 152 essentially closed to air flow through its bore 158, air may flow into the throttle bore 158 via the main carburetor bore 162 and the cavity 170. Like the embodiment of FIG. 16, this may provide increased airflow into the throttle bore 158 when the throttle valve 152 is in its idle position and thereby decrease the pressure differential across the fuel nozzle 160.

Figure 20:
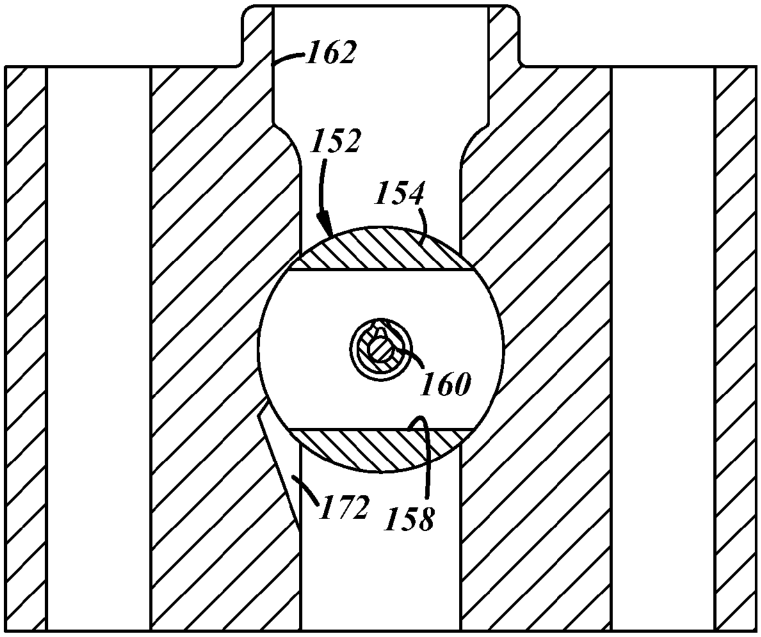
FIG. 20 is a view like FIG. 18 showing a modified carburetor body.

A similar supplemental void may be provided in the implementation of FIG. 20. But in this example, a cavity 172 is formed downstream of the throttle body 154 to communicate a downstream portion of the carburetor main bore 162 with the throttle bore 158 even when the throttle valve 152 is in its idle position. Like the implementation of FIG. 18, this may increase the pressure differential across the fuel nozzle 160.

Figure 21:
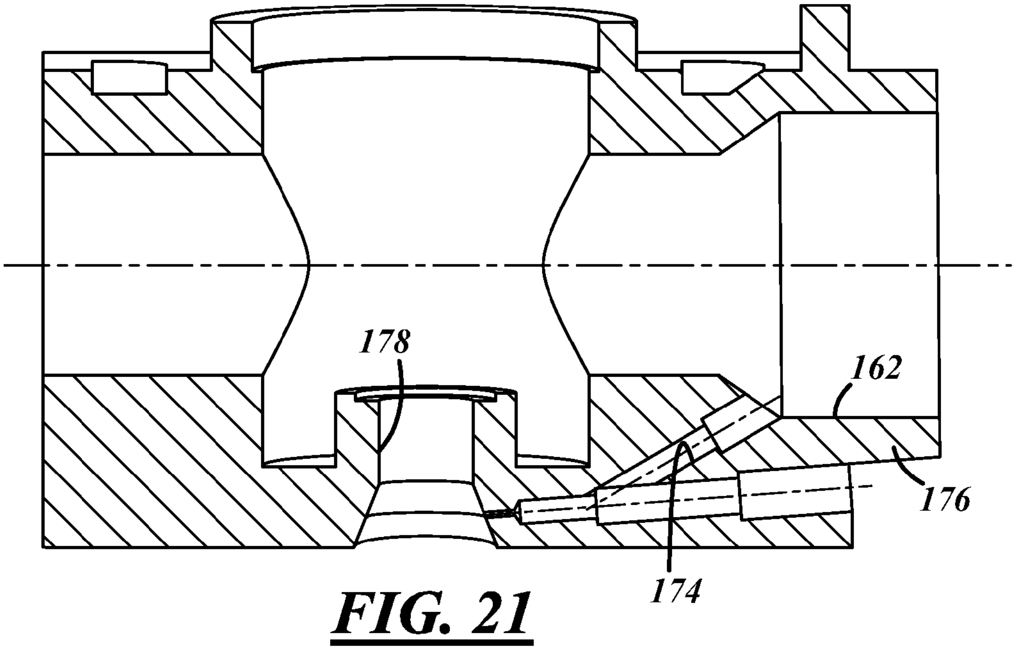
FIG. 21 is a sectional view of a carburetor body including an air bleed passage.

Finally, as shown in FIG. 21, a supplemental void may be defined by a passage 174 formed in a carburetor body 176 at least partially separate from the carburetor main bore 162. The passage 174 may communicate a source of air upstream of the throttle body with the throttle bore, or as shown, with a passage 178 in which the fuel nozzle (not shown) is located in assembly. In this way, air flowing through the passage 174 mixes with fuel between an inlet and an outlet of the nozzle. The air supplied through the passage may also flow around the nozzle and be mixed with fuel as the fuel exits the nozzle. Air flow through this passage 174 can, if desired, by selectively inhibited or prevented by a valve, such as a solenoid actuated valve like that shown in FIGS. 7 and 8.

Accordingly, the examples of the supplemental voids 164, 166, 170, 172, 174 shown in FIGS. 16-21 may each alter fuel flow within a carburetor as desired for a particular application. The supplemental void provides an unequal effective throttle opening between the upstream and downstream sides of the throttle body to control the fuel and air mixture at least in idle and certain off-idle operating conditions. The effective surface area of the throttle opening with the supplemental void may be between about 0.01% and 50% different between the upstream and downstream sides of the throttle body.

While the forms of the invention herein disclosed constitute presently preferred embodiments, many others are possible. For example, while the carburetors shown include butterfly type throttle valves and rotary valve carburetors, the purge and priming assembly, priming passage, pressure pulse passage and valve, as well as other features, can be used with other types of carburetors. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A purge and prime assembly for a carburetor, comprising:

a purge and prime pump that alternately takes in and discharges fluid;

a purge passage through which fluid is drawn by the purge and prime pump;

a return passage through which fluid is discharged from the purge and prime pump and discharged from the carburetor;

a purge valve that prevents fluid from being discharged from the purge and prime pump through the purge passage;

a return valve that prevents fluid in the return passage from being drawn into the purge and prime pump;

a priming passage communicating with the purge and prime pump and having an outlet directly communicating with a main bore of the carburetor and through the outlet a portion of the fluid discharged from the purge and prime pump is routed to the main bore of the carburetor;

a flow restrictor in the priming passage comprising a sheet of material with a thickness in the direction of fluid flow of not more than 0.35 mm and having a single hole through which all of the priming fuel flows with a diameter in the range of 0.05 mm to 0.3 mm and the flow restrictor defines the maximum restriction to flow in the priming passage; and the ratio of flow area of the flow restrictor to the minimum effective flow area of the purge passage is between 0.025:1 to 0.2:1.

2. The assembly of claim 1 wherein the carburetor includes a fuel pump diaphragm and the flow restrictor is formed in the fuel pump diaphragm.

3. The assembly of claim 1 wherein the flow restrictor is defined by an insert disposed in or adjacent to the priming passage, and the insert includes a hole through which all of the priming fuel flows.

4. The assembly of claim 3 wherein the insert is formed separately from and not in the same piece of material as another component of the carburetor.

5. The assembly of claim 1 wherein the flow restrictor is formed in the same piece of material as another component of the carburetor with a thickness of the piece of material of not more than 0.35 mm such that said component of the carburetor has its original function and also serves to restrict flow.

6. The assembly of claim 1 wherein the carburetor includes:

a fuel metering diaphragm that defines part of a fuel metering chamber and a reference chamber;

a pressure pulse passage communicating a source of pressure pulses with the fuel metering diaphragm to increase the rate at which fuel is discharged from the fuel metering chamber; and a valve that is movable between open and closed positions to at least substantially prevent communication of the pressure pulses with the fuel metering diaphragm when the valve is in its closed position.

7. The assembly of claim 6 wherein the valve is driven between its open and closed positions by a solenoid.

8. The assembly of claim 7 wherein the carburetor includes a body and the solenoid and valve are carried by the carburetor.

9. The assembly of claim 6 wherein the valve is opened during at least a portion of the time an engine is warmed up after initial starting of the engine.

10. The assembly of claim 1 wherein the sheet of material of the flow restrictor is a thin and flat sheet and through which the hole is formed by a laser.

11. The assembly of claim 1 further comprising:

a carburetor body having the main bore through which air flows and into which fuel is admitted to provide a fuel and air mixture to an engine;

a throttle valve rotatable relative to the main bore and having a throttle bore selectively aligned with the main bore to control fluid flow through the throttle bore and main bore; and a supplemental void formed in at least one of the body or the throttle valve to alter fluid flow through the throttle bore compared to a carburetor without the supplemental void.

12. The assembly of claim 11 wherein the supplemental void is formed in an upstream portion of the throttle valve, where upstream refers to the direction of fluid flow through the throttle bore and an idle position of the throttle valve.)

13. The assembly of claim 11 wherein the supplemental void is formed in a downstream portion of the throttle valve, where downstream refers to the direction of fluid flow through the throttle bore and an idle position of the throttle valve.

14. The assembly of claim 11 wherein the supplemental void is formed in a portion of the main bore and is open to an upstream portion of the throttle bore where upstream refers to the direction of fluid flow through the throttle bore.

15. The assembly of claim 11 wherein the supplemental void is formed in a portion of the main bore and is open to a downstream portion of the throttle bore where downstream refers to the direction of fluid flow through the throttle bore.

16. The assembly of claim 11 wherein the supplemental void includes a passage at least a portion of which is separate from the carburetor main bore and which provides additional air flow to the throttle bore.

17. A purge and prime assembly of a carburetor for an engine, comprising:

a carburetor having a main bore and a fuel metering chamber which in operation supplies fuel to the main bore;

a purge and prime pump which removes stale fuel and vapor from the carburetor including the fuel metering chamber and draws fresh fuel into the metering chamber before starting the engine;

a purge and prime passage through which fluid is drawn by the purge and prime pump;

a return passage through which fluid drawn from the carburetor is discharged from the purge and prime pump;

a purge valve that prevents fluid from being discharged from the purge and prime pump through the purge passage;

a return valve that prevents fluid in the return passage from being drawn into the purge and prime pump;

a priming passage communicating with the purge and prime pump and having an outlet directly communicating with the main bore of the carburetor through which a portion of the fluid discharged from the purge and prime pump is supplied to the main bore;

a flow restrictor in the priming passage which comprises a sheet of material with a thickness in the direction of fluid flow of less than 0.35 mm and a single hole through the sheet of material having a diameter in the range of 0.05 mm to 0.30 mm and through which all of the priming fluid flows; and the ratio of flow area of the single hole of the flow restrictor to the minimum effective flow area of the purge passage is between 0.025:1 to 0.2:1.

18. The assembly of claim 1 wherein the flow restrictor sheet of material is a sheet of metal and the single hole was initially machined in the metal sheet and, thereafter, the metal sheet was deformed to decrease the diameter of the single hole to the range of 0.05 mm to 0.3 mm.

* * * * *